(12) United States Patent
Dlugoss et al.

(10) Patent No.: US 9,352,749 B2
(45) Date of Patent: May 31, 2016

(54) TORQUE SENSOR BASED VEHICLE DIRECTION DETERMINATION

(75) Inventors: Randall B. Dlugoss, Royal Oak, MI (US); Micheal P. Portell, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2321 days.

(21) Appl. No.: 12/235,676

(22) Filed: Sep. 23, 2008

(65) Prior Publication Data

US 2010/0076654 A1 Mar. 25, 2010

(51) Int. Cl.
*G06F 17/00* (2006.01)
*B60W 30/18* (2012.01)

(52) U.S. Cl.
CPC ... *B60W 30/18036* (2013.01); *B60W 2510/105* (2013.01); *B60W 2520/06* (2013.01); *B60W 2520/10* (2013.01)

(58) Field of Classification Search
CPC ..... B60W 10/06; B60W 10/10; B60W 30/18; B60W 30/1819; B60W 10/04; B60W 10/11; B60W 2520/10; B60W 10/08; B60W 2710/0666
USPC .................................................... 701/51, 54
See application file for complete search history.

(56) References Cited

U.S. PATENT DOCUMENTS

| | | | |
|---|---|---|---|
| 5,938,712 A * | 8/1999 | Ibamoto et al. | 701/54 |
| 5,944,392 A * | 8/1999 | Tachihata et al. | 303/112 |
| 6,173,226 B1 * | 1/2001 | Yoshida et al. | 701/51 |
| 6,701,224 B1 * | 3/2004 | Klusemann | 701/1 |
| 6,931,316 B2 * | 8/2005 | Joe et al. | 701/61 |
| 7,752,923 B2 * | 7/2010 | Shimizu | 73/862.333 |
| 2002/0111248 A1 * | 8/2002 | Schmid | 477/44 |
| 2004/0167705 A1 * | 8/2004 | Lingman et al. | 701/124 |
| 2004/0176899 A1 * | 9/2004 | Hallowell | 701/84 |
| 2004/0225888 A1 | 11/2004 | Leaming | |
| 2006/0116806 A1 * | 6/2006 | Steen et al. | 701/51 |
| 2006/0237249 A1 * | 10/2006 | Steen et al. | 180/198 |
| 2007/0225888 A1 * | 9/2007 | Morris | 701/51 |
| 2007/0227268 A1 * | 10/2007 | Ouyang et al. | 73/862.333 |
| 2008/0016978 A1 * | 1/2008 | Nagano et al. | 74/473.18 |
| 2008/0312029 A1 * | 12/2008 | Matsubara et al. | 477/3 |

FOREIGN PATENT DOCUMENTS

| CN | 1940515 | 7/2012 |
|---|---|---|
| DE | 102007058416 | 7/2008 |

* cited by examiner

Primary Examiner — Truc M Do

(57) ABSTRACT

A control system of a vehicle comprises a torque sensor, a vehicle direction module, and a control module. The torque sensor determines a driveline torque signal based on a torque produced by a device of a driveline. The vehicle direction module determines whether a vehicle direction includes one of a forward direction and a reverse direction based on the driveline torque signal. The control module controls the vehicle based on the vehicle direction.

17 Claims, 4 Drawing Sheets

TORQUE SENSOR BASED VEHICLE DIRECTION DETERMINATION

FIELD

The present disclosure relates to determining direction and more particularly to determining direction of a vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Speed and direction sensors have been used by control systems of a vehicle to determine a direction of the vehicle. Traditional speed and direction sensors, however, do not determine the direction of the vehicle as quickly as desired, especially at startup and at low speeds. Further, traditional speed and direction sensors generate frequency-based signals that require filtering and conditioning, which slow the detection of faults in the sensors.

SUMMARY

A control system of a vehicle comprises a torque sensor, a vehicle direction module, and a control module. The torque sensor determines a driveline torque signal based on a torque produced by a device of a driveline. The vehicle direction module determines whether a vehicle direction includes one of a forward direction and a reverse direction based on the driveline torque signal. The control module controls the vehicle based on the vehicle direction.

A method of operating a control system of a vehicle comprises determining a driveline torque signal based on a torque produced by a device of a driveline; determining a vehicle direction to include one of a forward direction and a reverse direction based on the driveline torque signal; and controlling the vehicle based on the vehicle direction.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
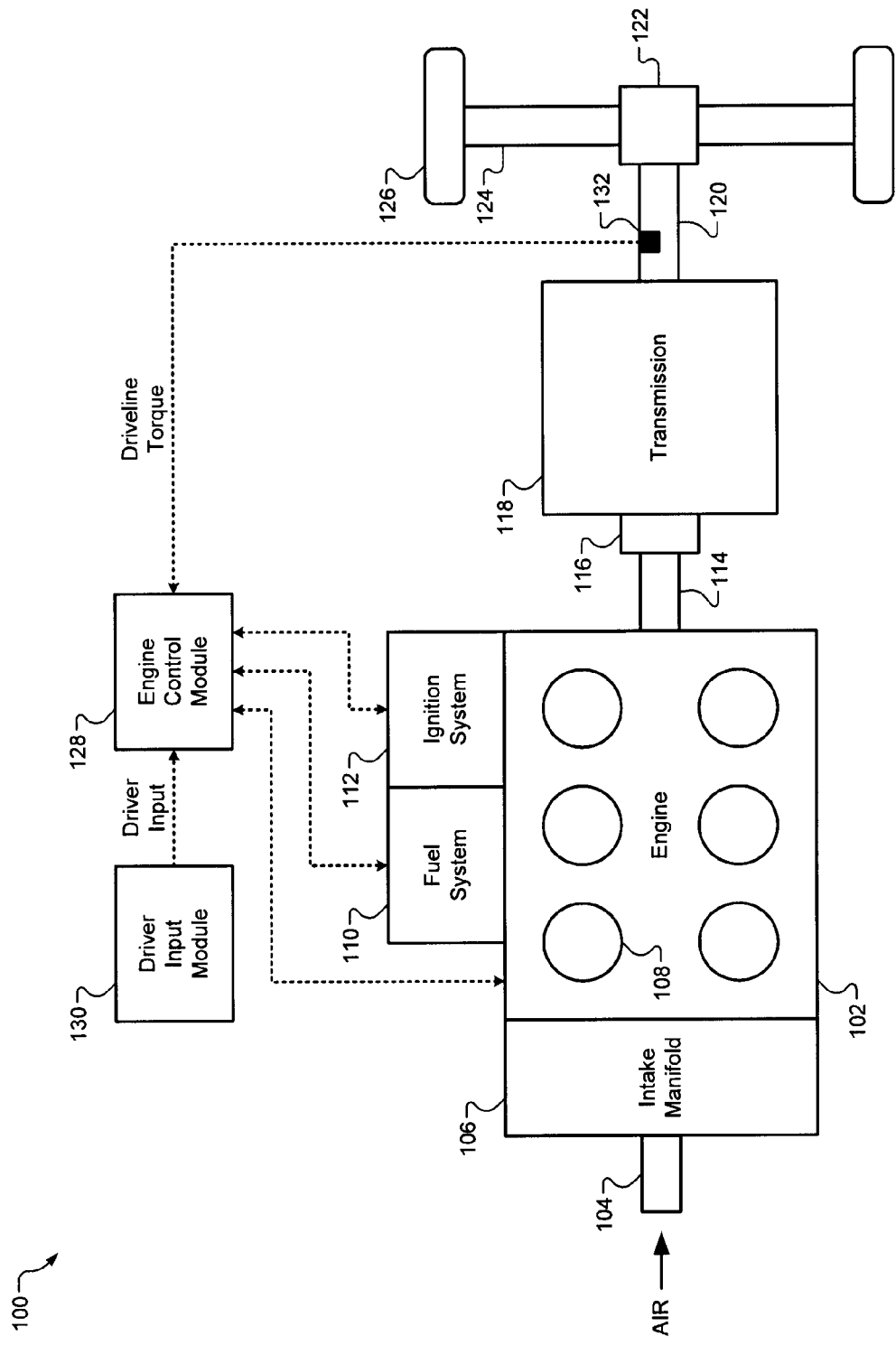
FIG. 1 is a functional block diagram of an exemplary implementation of a vehicle according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A vehicle of the present disclosure includes a torque sensor that is used to quickly and accurately determine a direction of the vehicle. The torque sensor is installed on a device of a driveline and measures a torque produced by the device. The vehicle further includes a vehicle direction determination module that determines the direction of the vehicle based on the torque produced by the driveline. The direction of the vehicle is determined before the actual movement of the vehicle and is nearly instantaneous. Further, the torque sensor may be used in addition to a speed and direction sensor, and thus the sensors may be used to diagnose, for example only, faults and/or accuracy of each other.

Referring now to FIG. 1, a functional block diagram of an exemplary implementation of a vehicle 100 is shown. The vehicle 100 includes an engine 102, an inlet 104, an intake manifold 106, cylinders 108, a fuel system 110, an ignition system 112, a crankshaft 114, and a coupling device 116. The vehicle 100 further includes a transmission 118, a driveshaft 120, a differential 122, an axle 124, wheels 126, and an engine control module 128. The vehicle 100 further includes a driver input module 130 and a torque sensor 132.

The engine 102 combusts an air/fuel mixture to produce a drive torque. For example only, the engine 102 may include an internal combustion engine, a diesel engine, a homogenous charge compression ignition (HCCI) engine, and/or other engines. Air is drawn into the engine 102 through the inlet 104 and the intake manifold 106.

Air within the engine 102 is distributed into the cylinders 108. Although FIG. 1 depicts six cylinders, it should be appreciated that the engine 102 may include additional or fewer cylinders. For example, engines having 4, 5, 6, 10, 12 and 16 cylinders are contemplated.

The fuel system 110 may inject fuel into the intake manifold 106 at a central location or may inject fuel into the intake manifold 106 at multiple locations. Alternatively, the fuel system 110 may inject fuel directly into the cylinders 108. The air mixes with the injected fuel and creates the air/fuel mixture in the cylinders 108.

Pistons (not shown) within the cylinders 108 compress the air/fuel mixture. The air/fuel mixture may be ignited in any suitable manner. For example only, if the engine 102 includes a diesel engine and/or an HCCI engine, at low engine loads and low to medium engine speeds (RPMs), heat generated by compression ignites the air/fuel mixture. In other engine systems, the ignition system 112 ignites the air/fuel mixture via spark plugs (not shown). The combustion of the air/fuel mixture drives the pistons down, thereby driving the crankshaft 114 and producing the drive torque.

The coupling device 116 connects the crankshaft 114 to the transmission 118 and transmits the drive torque from the crankshaft 114 to the transmission 118. For example only, the coupling device 116 may include a clutch, a torque converter, and/or other coupling devices. The transmission 118 uses one of various gear ratios to transfer torque between the engine 102 and the driveshaft 120.

The driveshaft 120 delivers the drive torque from the transmission 118 to the differential 122. The differential 122 uses the drive torque to supply torque through the axle 124 to the wheels 126, which may drive the vehicle 100. The differential 122 allows the wheels 126 to rotate at different speeds.

The engine control module 128 controls operation of the engine 102, the fuel system 110, and/or the ignition system 112 based on various engine operating parameters. The engine control module 128 may also control any other suitable parameter, such as airflow into the engine via a throttle valve. The engine control module 128 communicates with the engine 102, the fuel system 110, and the ignition system 112. The engine control module 128 also communicates with the driver input module 130 that generates a driver input signal based on, for example, an accelerator pedal position.

The engine control module 128 is further in communication with the torque sensor 132 measures a torque of the driveshaft 120 (i.e., driveshaft torque) and generates a driveline torque signal accordingly. For example only, the torque sensor 132 may include at least one magnetometer that measures a disturbance in a magnetic flux that is created when the driveshaft 120 is deformed due to the drive torque. The torque sensor 132 may determine the torque produced by the driveshaft 120 based on the disturbance in the magnetic flux.

Although FIG. 1 depicts the torque sensor 132 in communication with the engine control module 128, it should be appreciated that the torque sensor 132 may be in communication with other control modules of the vehicle 100. For example only, the torque sensor 132 may be in communication with a transmission control module, an anti-lock braking system (ABS) control module, a body control module, and/or any other suitable module or system. In addition, although FIG. 1 depicts generating the driveline torque signal based on the torque produced by the driveshaft 120, it should be appreciated that the torque sensor 132 may generate the driveline torque signal based on a torque produced by any suitable component of the driveline. For example only, the torque sensor 132 may generate the driveline torque signal based on a torque produced by the axle 124, the differential 122, and/or any other suitable component of the driveline.

Figure 2:
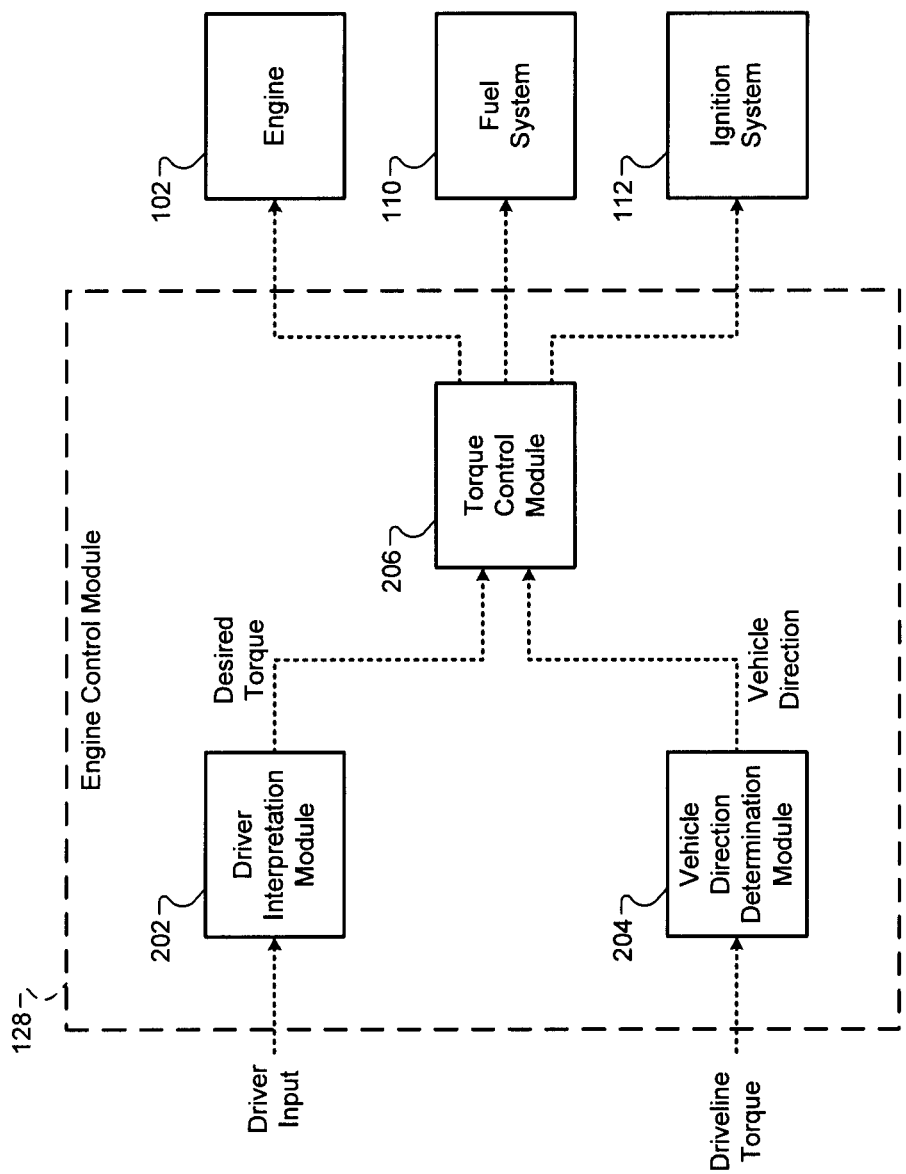
FIG. 2 is a functional block diagram of an exemplary implementation of an engine control module according to the principles of the present disclosure.

Referring now to FIG. 2, a functional block diagram of an exemplary implementation of the engine control module 128 is shown. The engine control module 128 includes a driver interpretation module 202, a vehicle direction determination module 204, and a torque control module 206. The driver interpretation module 202 receives the driver input signal and determines a desired torque for the engine 102 to produce based on the driver input.

The vehicle direction determination module 204 receives the driveline torque signal and generates a vehicle direction signal based on the driveline torque. When the magnitude of the driveline torque is greater than the magnitude of opposing torques (i.e., the engine 102 is driving the vehicle 100) and the driveline torque is positive in value, the vehicle direction is determined to be a forward direction. For example only, the opposing torques may be caused by friction within the vehicle 100, friction at the wheels 126, gravity, drag, inertia, and/or any other source of torque that opposes the torque output of the engine 102. The opposing torques may be determined based on signals from various sensors (e.g., speed sensors) of the vehicle 100 and/or may be predetermined based on models. When the magnitude of the driveline torque is greater than the magnitude of opposing torques and the driveline torque is negative in value, the vehicle direction is determined to be a reverse direction.

When the magnitude of the driveline torque is less than the magnitude of opposing torques (i.e., the opposing torques are driving the vehicle 100) and the driveline torque is positive in value, the vehicle direction is determined to be the reverse direction. The vehicle direction is determined to be the reverse direction because the magnitude of the driveline torque is not large enough to overcome the magnitude of the opposing torques. When the magnitude of the driveline torque is less than the magnitude of opposing torques and the driveline torque is negative in value, the vehicle direction is determined to be the forward direction. The vehicle direction is determined to be the forward direction because the magnitude of the driveline torque is large enough to overcome the magnitude of the opposing torques.

In another embodiment, when the magnitude of the driveline torque is greater than the magnitude of opposing torques and the driveline torque is positive in value, the vehicle direction is determined to be the reverse direction. When the magnitude of the driveline torque is greater than the magnitude of opposing torques and the driveline torque is negative in value, the vehicle direction is determined to be the forward direction. When the magnitude of the driveline torque is less than the magnitude of opposing torques and the driveline torque is positive in value, the vehicle direction is determined to be the forward direction. When the magnitude of the driveline torque is less than the magnitude of opposing torques and the driveline torque is negative in value, the vehicle direction is determined to be the reverse direction. Whether the vehicle direction determination module 204 determines the vehicle direction based on this embodiment or the prior embodiment depends on the configuration of the vehicle powertrain and the orientation of the torque sensor 132.

The vehicle direction determination module 204 outputs the vehicle direction to the torque control module 206. Although FIG. 2 depicts outputting the vehicle direction to the torque control module 206, it should be appreciated that the vehicle direction may also be outputted to any other module or system. Further, although FIG. 2 depicts the vehicle direction determination module 204 located in the engine control module 128, it should be appreciated that the vehicle direction determination module 204 may be located in any suitable location, such as external to the engine control module 128 or within any other system or module that receive the driveline torque signal.

The torque control module 206 receives the desired torque and the vehicle direction. The torque control module 206 controls at least one of the engine 102, the fuel system 110, and the ignition system 112 based on the desired torque and the vehicle direction. The torque control module 206 may also control any other suitable engine system or parameter based on the vehicle direction, such as airflow into the engine 102.

For example only, the desired torque and the opposing torques should naturally be balanced or zero when the vehicle is not moving (accounting for hysteresis and losses). The vehicle direction, however, may be the reverse direction (e.g., due to the vehicle 100 moving backwards on a hill). In such a case, the opposing torques are greater than the drive torque. Accordingly, the torque control module 206 may increase the amount of fuel injected by the fuel system 110 and/or airflow into the engine 102 to increase the drive torque to match the opposing torques (e.g., to prevent the vehicle 100 from moving backwards on the hill). The torque control module 206 may also initiate a diagnostic, set a diagnostic flag, illuminate a light (e.g., a check engine light), and/or perform any other suitable remedial action.

Figure 3:
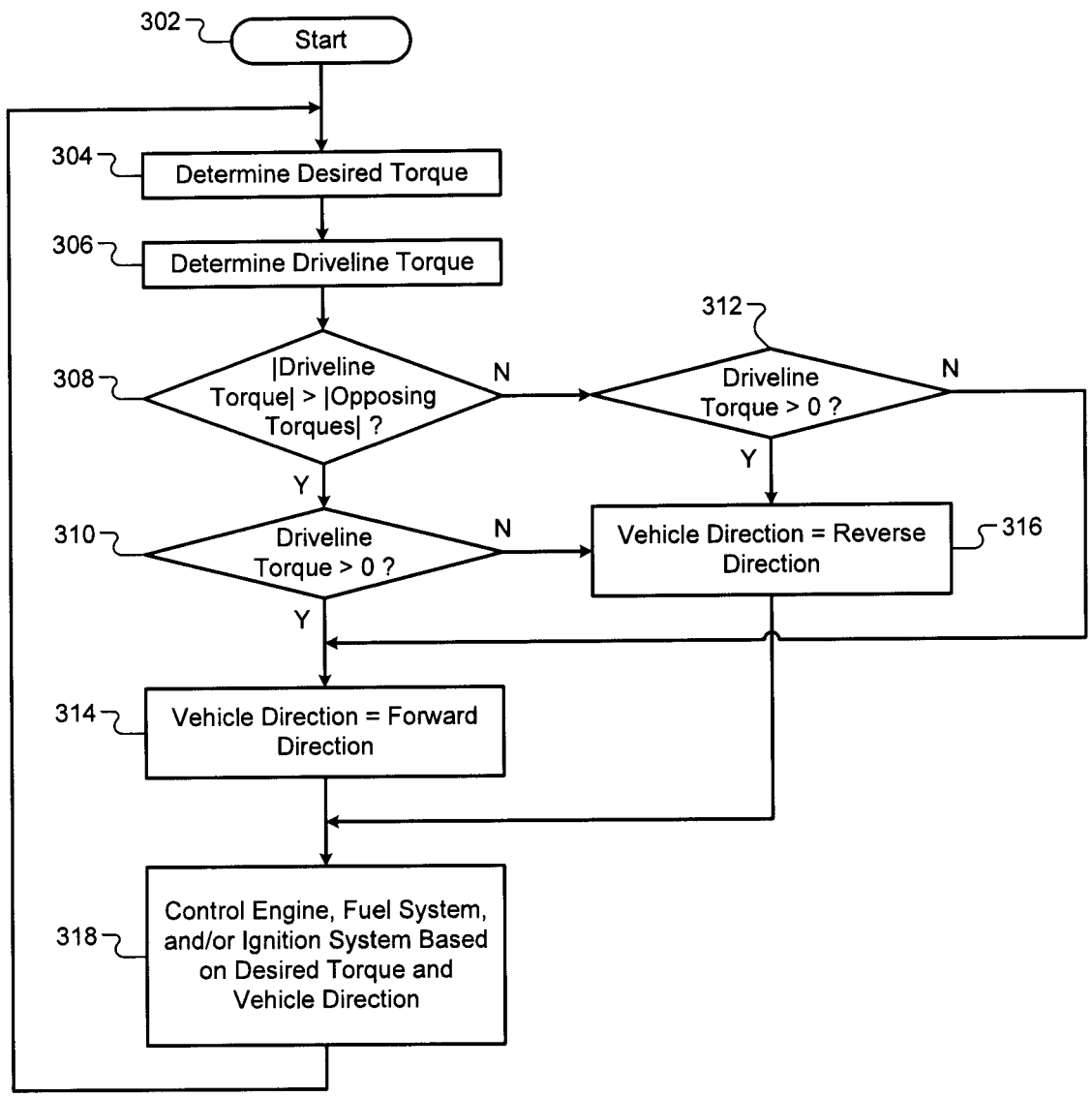
FIG. 3 is a flowchart depicting exemplary steps performed by the engine control module according to the principles of the present disclosure.

Referring now to FIG. 3, a flowchart depicting exemplary steps performed by the engine control module 128 is shown. Control begins in step 302. In step 304, the desired torque is determined. In step 306, the driveline torque is determined.

In step 308, control determines whether the magnitude of the driveline torque is greater than the magnitude of opposing torques (e.g., which may be a predetermined value). If true, control continues in step 310. If false, control continues in step 312. In step 310, control determines whether the driveline torque is greater than zero. If true, control continues in step 314. If false, control continues in step 316.

In step 312, control determines whether the driveline torque is greater than zero. If true, control continues in step 316. If false, control continues in step 314. In step 314, the vehicle direction is determined to be the forward direction. Control continues in step 318.

In step 316, the vehicle direction is determined to be the reverse direction. Control continues in step 318. In step 318, at least one of the engine 102, the fuel system 110, and the ignition system 112 is controlled based on the desired torque and the vehicle direction. Control returns to step 304.

Figure 4:
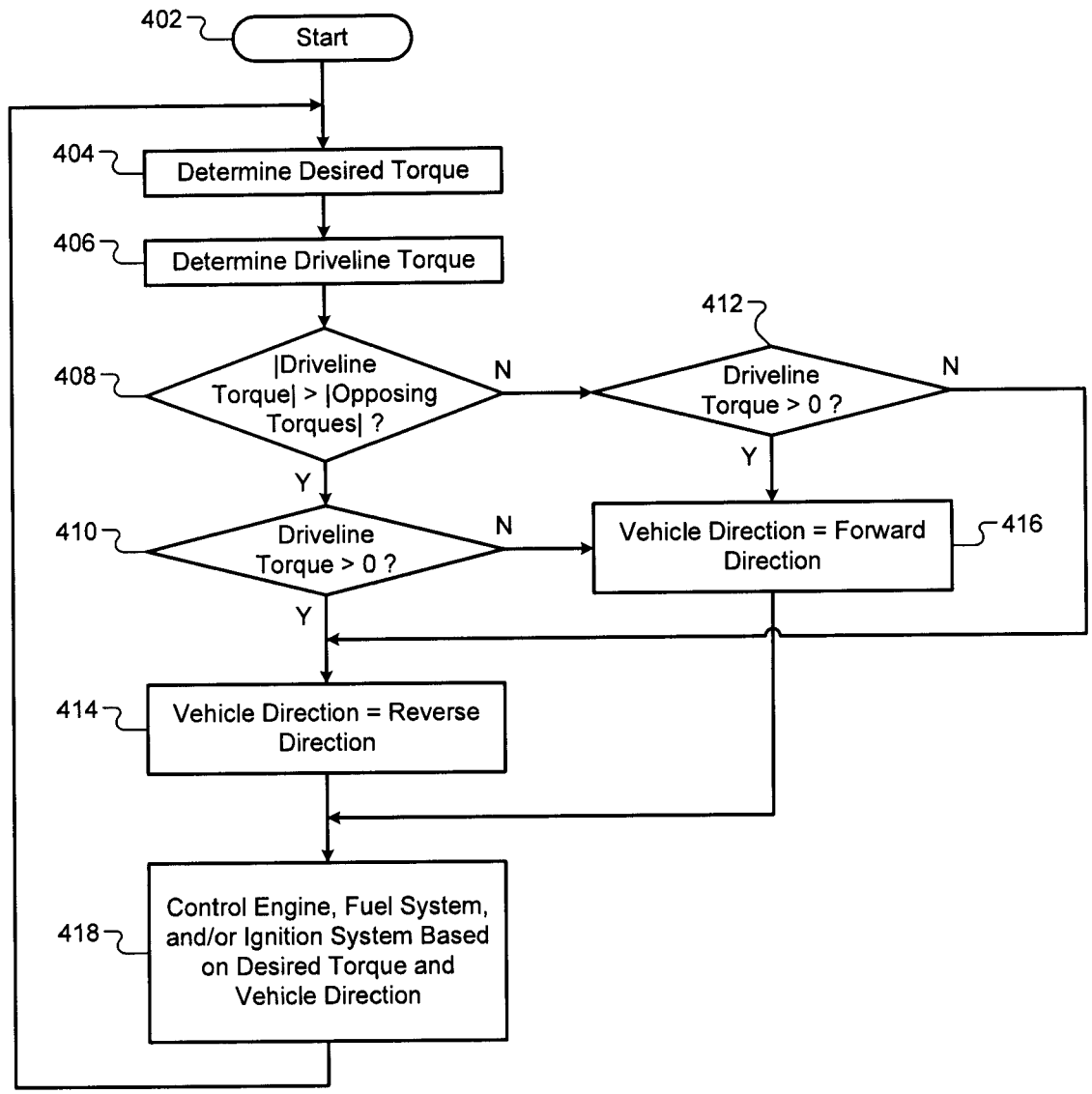
FIG. 4 is a flowchart depicting another set of exemplary steps performed by the engine control module according to the principles of the present disclosure.

Referring now to FIG. 4, a flowchart depicting alternative exemplary steps performed by the engine control module 128 is shown. Control begins in step 402. In step 404, the desired torque is determined. In step 406, the driveline torque is determined.

In step 408, control determines whether the magnitude of the driveline torque is greater than the magnitude of opposing torques (e.g., which may be a predetermined value). If true, control continues in step 410. If false, control continues in step 412. In step 410, control determines whether the driveline torque is greater than zero. If true, control continues in step 414. If false, control continues in step 416.

In step 412, control determines whether the driveline torque is greater than zero. If true, control continues in step 416. If false, control continues in step 414. In step 414, the vehicle direction is determined to be the reverse direction. Control continues in step 418.

In step 416, the vehicle direction is determined to be the forward direction. Control continues in step 418. In step 418, at least one of the engine 102, the fuel system 110, and the ignition system 112 is controlled based on the desired torque and the vehicle direction. Control returns to step 404.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system of a vehicle, comprising:
a torque sensor that determines a driveline torque signal based on a torque produced by a device of a driveline;
a vehicle direction module that determines whether a vehicle direction includes one of a forward direction and a reverse direction based on the driveline torque signal; and
a control module that controls the vehicle based on the vehicle direction.

2. The control system of claim 1 wherein the control module includes at least one of an engine control module, a transmission control module, an anti-lock braking system (ABS) control module, and a body control module.

3. The control system of claim 1 wherein the device of the driveline includes one of a driveshaft and an axle.

4. The control system of claim 1 wherein the vehicle direction module selects the forward direction when a magnitude of the driveline torque is greater than a magnitude of opposing torques and the driveline torque is greater than zero in value, and selects the reverse direction when the magnitude of the driveline torque is greater than the magnitude of the opposing torques and the driveline torque is less than zero in value.

5. The control system of claim 4 wherein the opposing torques are caused by friction within the vehicle, friction at wheels of the vehicle, gravity, and inertia of the vehicle.

6. The control system of claim 1 wherein the vehicle direction module selects the reverse direction when a magnitude of the driveline torque is less than a magnitude of opposing torques and the driveline torque is greater than zero in value, and selects the forward direction when the magnitude of the driveline torque is less than the magnitude of the opposing torques and the driveline torque is less than zero in value.

7. The control system of claim 1 wherein the vehicle direction module selects the reverse direction when a magnitude of the driveline torque is greater than a magnitude of opposing torques and the driveline torque is greater than zero in value, and selects the forward direction when the magnitude of the driveline torque is greater than the magnitude of the opposing torques and the driveline torque is less than zero in value.

8. The control system of claim 1 wherein the vehicle direction module selects the forward direction when a magnitude of the driveline torque is less than a magnitude of opposing torques and the driveline torque is greater than zero in value, and selects the reverse direction when the magnitude of the driveline torque is less than the magnitude of the opposing torques and the driveline torque is less than zero in value.

9. The control system of claim 1 wherein the control system includes a torque control module that controls a torque produced by an engine based on the vehicle direction.

10. The control system of claim 1 wherein the control system includes a torque control module that controls at least one of an engine, a fuel system, and an ignition system based on the vehicle direction.

11. A method of operating a control system of a vehicle, comprising:
determining a driveline torque signal based on a torque produced by a device of a driveline;
determining a vehicle direction to include one of a forward direction and a reverse direction based on the driveline torque signal; and
controlling the vehicle based on the vehicle direction.

12. The method of claim 11 further comprising:
selecting the forward direction when a magnitude of the driveline torque is greater than a magnitude of opposing torques and the driveline torque is greater than zero in value; and
selecting the reverse direction when the magnitude of the driveline torque is greater than the magnitude of the opposing torques and the driveline torque is less than zero in value.

13. The method of claim 11 further comprising:
selecting the reverse direction when a magnitude of the driveline torque is less than a magnitude of opposing torques and the driveline torque is greater than zero in value; and selecting the forward direction when the magnitude of the driveline torque is less than the magnitude of the opposing torques and the driveline torque is less than zero in value.

14. The method of claim 11 further comprising:

selecting the reverse direction when a magnitude of the driveline torque is greater than a magnitude of opposing torques and the driveline torque is greater than zero in value; and selecting the forward direction when the magnitude of the driveline torque is greater than the magnitude of the opposing torques and the driveline torque is less than zero in value.

15. The method of claim 11 further comprising:

selecting the forward direction when a magnitude of the driveline torque is less than a magnitude of opposing torques and the driveline torque is greater than zero in value; and selecting the reverse direction when the magnitude of the driveline torque is less than the magnitude of the opposing torques and the driveline torque is less than zero in value.

16. The method of claim 11 further comprising controlling a torque produced by an engine based on the vehicle direction.

17. The method of claim 11 further comprising controlling at least one of an engine, a fuel system, and an ignition system based on the vehicle direction.

* * * * *